US011561602B2

(12) United States Patent
Guynes et al.

(10) Patent No.: US 11,561,602 B2
(45) Date of Patent: Jan. 24, 2023

(54) DISPLAY DEVICE POWER MODE

(71) Applicant: HEWLETT-PACKARD DEVELOPMENT COMPANY, L.P., Houston, TX (US)

(72) Inventors: Timothy P. Guynes, Houston, TX (US); Humberto M. Fossati, Houston, TX (US); Wen Shih Chen, Taipei (TW)

(73) Assignee: HEWLETT-PACKARD DEVELOPMENT COMPANY, LP., Houston, TX (US)

( * ) Notice: Subject to any disclaimer, the term of this patent is extended or adjusted under 35 U.S.C. 154(b) by 0 days.

(21) Appl. No.: 16/095,690

(22) PCT Filed: Apr. 22, 2016

(86) PCT No.: PCT/US2016/028779
§ 371 (c)(1),
(2) Date: Oct. 22, 2018

(87) PCT Pub. No.: WO2017/184159
PCT Pub. Date: Oct. 26, 2017

(65) Prior Publication Data
US 2019/0129495 A1 May 2, 2019

(51) Int. Cl.
G06F 1/3234 (2019.01)
G06F 1/3287 (2019.01)
(Continued)

(52) U.S. Cl.
CPC .......... G06F 1/3265 (2013.01); G06F 1/3287 (2013.01); G06F 3/0482 (2013.01);
(Continued)

(58) Field of Classification Search
CPC .. G06F 3/0482; G06F 1/3265; G06F 3/04847; G06F 1/3287; G09G 2320/046;
(Continued)

(56) References Cited

U.S. PATENT DOCUMENTS 5,675,364 A * 10/1997 Stedman ............... G06F 1/3218
345/211
5,881,300 A * 3/1999 Chen ..................... G06F 1/3215
713/340

(Continued)

FOREIGN PATENT DOCUMENTS

CN 101059671 10/2007
CN 102196204 A 9/2011
(Continued)

OTHER PUBLICATIONS

Screenshots of Windows 7, Help and Support, Keyboard Shortcuts (2009, pp. 1-3).*
(Continued)

Primary Examiner — Jennifer N Welch
Assistant Examiner — Amy P Hoang
(74) Attorney, Agent, or Firm — Quarles & Brady LLP

(57) ABSTRACT

The first time a display device is turned on, is turned on after it has been factory reset, or is factory reset, the display device displays a message indicating that in a default and current power mode of the display device, a hardware component of the display device different than display hardware is powered off when the display device enters a low-power state. A user is permitted to have the hardware component remain powered on when the display device enters the low-power state.

15 Claims, 6 Drawing Sheets

(51) Int. Cl.
*H04N 5/63* (2006.01)
*G06F 3/0482* (2013.01)
*G06F 3/04847* (2022.01)
*G09G 5/00* (2006.01)
*H04N 21/443* (2011.01)

(52) U.S. Cl.
CPC ......... *G06F 3/04847* (2013.01); *G09G 5/003* (2013.01); *H04N 5/63* (2013.01); *G09G 2330/021* (2013.01); *G09G 2330/022* (2013.01); *G09G 2354/00* (2013.01); *H04N 21/4432* (2013.01); *Y02D 10/00* (2018.01); *Y02D 30/50* (2020.08)

(58) Field of Classification Search
CPC ............. G09G 5/003; G09G 2330/021; G09G 2354/00; G09G 2330/022; H04N 5/63; H04N 21/4432; Y02D 10/00; Y02D 30/50
See application file for complete search history.

(56) References Cited

U.S. PATENT DOCUMENTS

| | | | | |
|---|---|---|---|---|
| 5,978,923 | A * | 11/1999 | Kou | G06F 1/3203 713/323 |
| 6,493,002 | B1 * | 12/2002 | Christensen | G06F 3/0481 715/779 |
| 2004/0029621 | A1 | 2/2004 | Karaoguz et al. | |
| 2005/0068016 | A1 | 3/2005 | Hung | |
| 2007/0045441 | A1 * | 3/2007 | Ashworth | G05D 23/1902 236/94 |
| 2007/0268397 | A1 | 11/2007 | Udono | |
| 2008/0270809 | A1 | 10/2008 | Hoffer et al. | |
| 2009/0024855 | A1 | 1/2009 | Hsieh | |
| 2010/0082414 | A1 | 4/2010 | Shimaya | |
| 2010/0115296 | A1 | 5/2010 | Inoue | |
| 2012/0320280 | A1 | 12/2012 | Waites et al. | |
| 2015/0067373 | A1 | 3/2015 | So et al. | |
| 2015/0185971 | A1 * | 7/2015 | Gomez | G06F 3/0482 715/810 |
| 2017/0048801 | A1 * | 2/2017 | Choi | H04W 88/02 |
| 2017/0263208 | A1 | 9/2017 | Imai et al. | |
| 2021/0390915 | A1 | 12/2021 | Park et al. | |

FOREIGN PATENT DOCUMENTS

| | | |
|---|---|---|
| CN | 102365616 | 2/2012 |
| CN | 104238718 | 12/2014 |
| EP | 0626633 | 11/1994 |
| GB | 2448722 | 10/2008 |
| WO | WO2010090646 | 8/2010 |
| WO | WO2014187341 | 11/2014 |

OTHER PUBLICATIONS

Kilshore, "Preventing Windows from Turning Off USB Devices", Oct. 3, 2009, https://helpdeskgeek.com/how-to/prevent-windows-from-powering-off-usb-device/.*
Adder Technology Ltd., "AdderView Matrix MP Installation and Use", Oct. 2003, 80 pages.
Fujitsu Technology Solutions GmbH, "Operating Manual X23T-1, MHL", Sep. 2012, 42 pages.
NEC, "User's Manual MultiSync X464UN MultiSyncX464UNS MultiSync X464UNV MultiSync X554UN MultiSync X554UNS", Feb. 10, 2005, 55 pages.
Public Mode Setting Procedure (LC-52/60/70LE640U/C6400U), Apr. 9, 2012, 8 pages.
Techview, "Service Manual for the Envision EN9410", Feb. 18, 2005, Revision 1A, 48 pages.

* cited by examiner

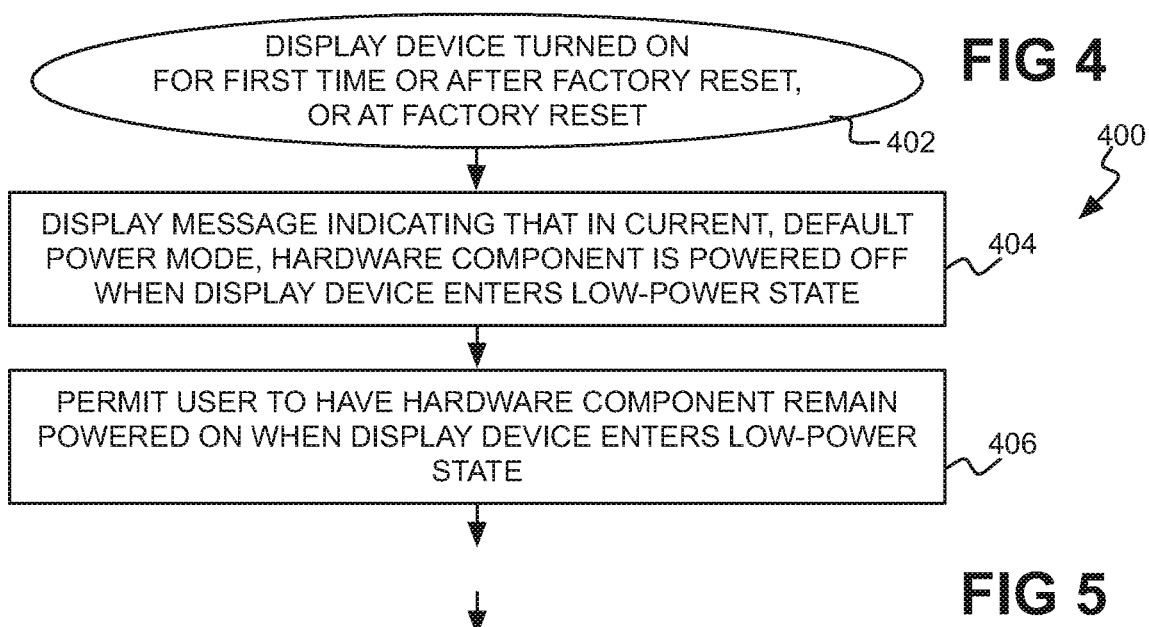
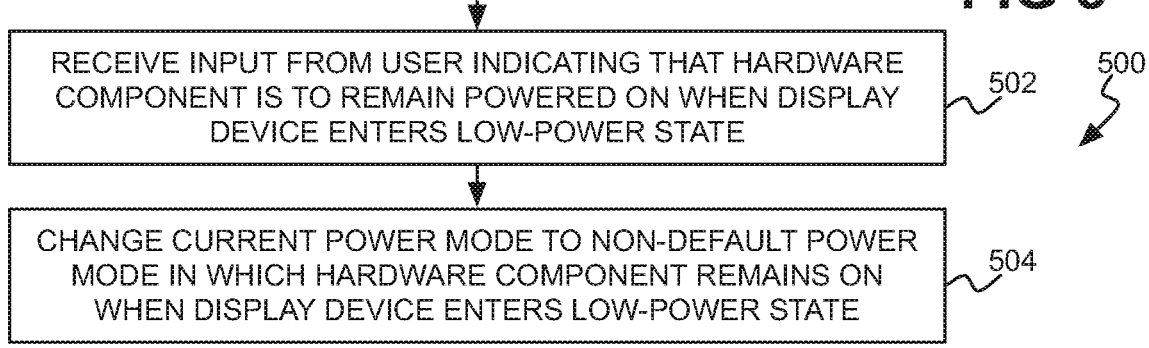
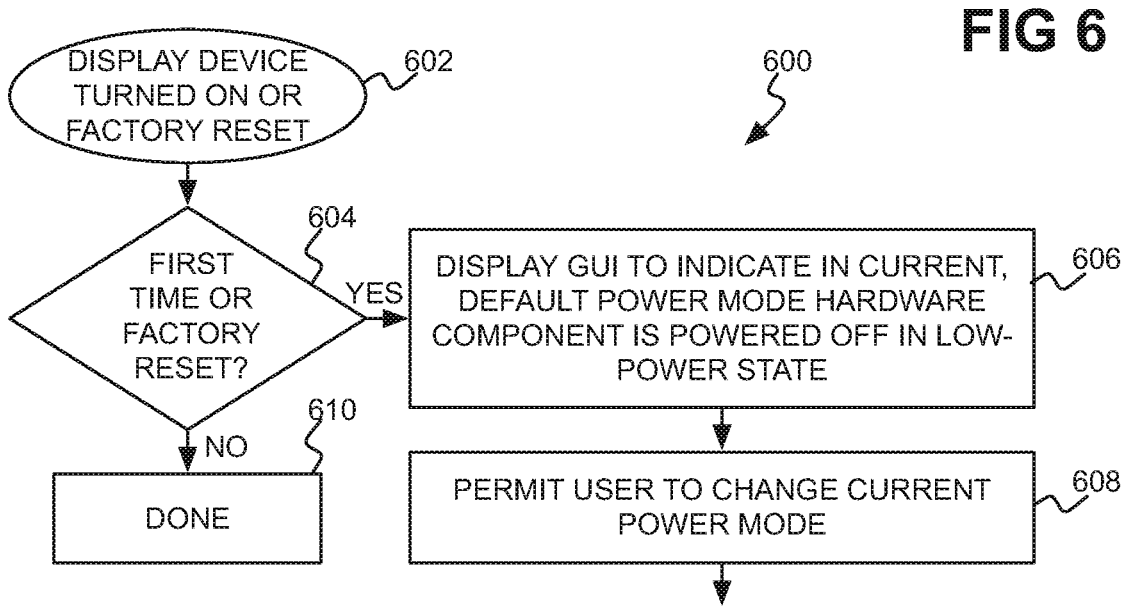

FIG 9A

```
POWER MODE

The display is currently set to "Power Saver" mode, which
disables the following during low power sleep and DC
power off states:

-   USB hub/ports and any device connected to them
-   Wireless charging
-   USB-PD (Power Delivery/charging)
-   Audio To switch between "Power Saver," "Performance," and
"Custom" power modes, use the button controls and press
the following button:
```

900

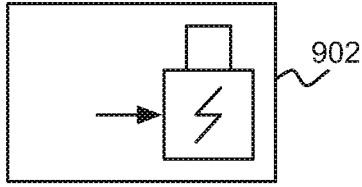

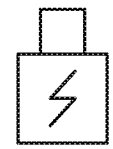 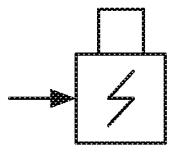 

952

| Button 3 954C | Button 2 954B | Button 1 954A |

DISPLAY DEVICE POWER MODE

BACKGROUND

Display devices include stand-alone monitors that can be communicatively connected to computing devices, like desktop computers, which lack built-in displays. Such stand-alone monitors can also be connected to other types of computing devices, such as laptop computers, tablet computing devices, and mobile computing devices like smartphones, which have built-in displays, to either supplement or temporarily replace the build-in displays. Display devices further include televisions that are primarily if not exclusively intended to be used for content-display purposes, such as television shows, streaming video, and so on. Such display devices include televisions, for instance.

BRIEF DESCRIPTION OF THE DRAWINGS

FIGS. 4, 5, and 6 are flowcharts of varying example methods for a hardware component of a display device to remain on when the display device enters a state such as a low-power state.

FIGS. 9A and 9B are diagrams of further example GUIs that can be displayed when the methods of FIGS. 4, 5, and/or 6 are performed.

DETAILED DESCRIPTION

Figure 1:
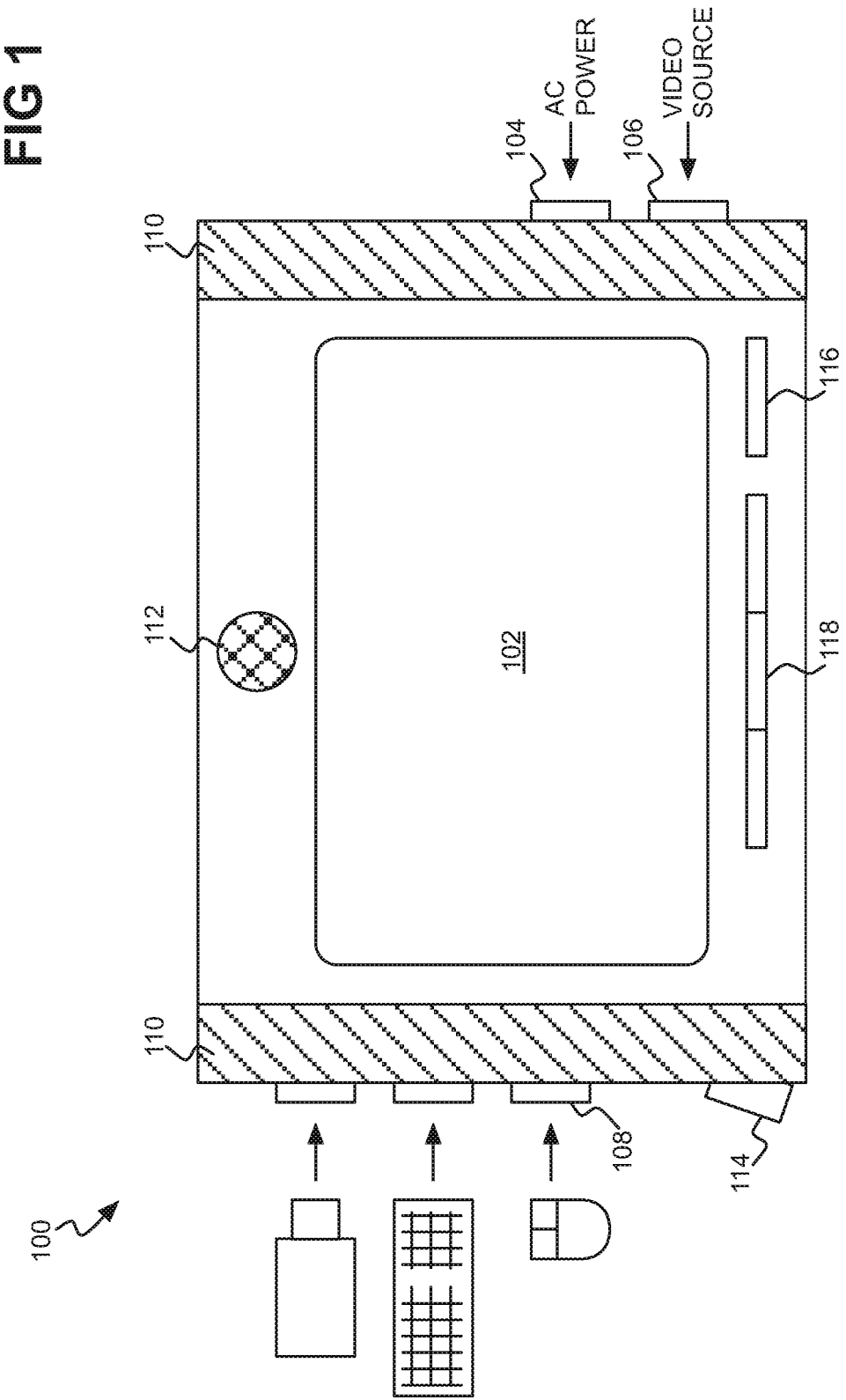
FIG. 1 is a diagram of an example display device.

As noted in the background, stand-alone display devices include such devices that can be connected to computing devices that themselves may or may not have built-in displays, as well as display devices like televisions. These display devices include built-in display hardware to display images for one or more users to view. Currently popular display hardware may be in the form of flat-panel display hardware, leveraging liquid crystal display (LCD) as well as other technologies, for instance.

Stand-alone display devices may also have additional hardware, other than the display hardware. For example, many display devices include one or more input/output (I/O) ports, such as universal serial bus (USB) ports. Such I/O ports can assist in extending the functionality of the computing device to which a display device is connected. For instance, a user may be permitted to connect a USB cable between a USB port on his or her desktop computer and a USB port of a display device. Peripherals such as keyboards, mice, flash drives, and so on may be connected to other USB ports of the display device in lieu of being connected to the computer directly, and yet still be able to be accessible by the computer through the display device. A USB port of a television may similarly be receptive to a peripheral. Other types of hardware components of a stand-alone display device can include speakers, microphones, as well as the touchscreen portion of the display of the device that is able to detect user touch. Still other types of hardware components of such a display device can include webcams, USB audio hardware, USB power delivery/charging (USB-PD) hardware, touch controls, wireless charging hardware that wirelessly charge devices such as smartphones, and so on.

Traditionally, either unilaterally or at the behest of regulations, manufacturers have built power-saving technologies into their display devices. In general, the highest power-consuming hardware component of a display device is the display itself, including the backlight of the display. Therefore, a stand-alone display device may include different power modes that can operate independently of any computing device connected to the display device. For example, if an active video signal, such as a high-definition multimedia interface (HDMI) signal, is not detected on any video input port of the display device, then the display device may turn off its display. As another example, if the currently selected active video signal remains static for a length of time, then the display device may decrease the intensity of the display's backlight. In such cases, the other hardware components of the display device, such as USB ports, remain operational and powered on.

However, governments across the globe have more recently strengthened or have proposed strengthening their environmental regulations, specifically as to how much power a display device can consume while it is on but not actively displaying an image on the device's display—i.e., when the display is off. Many display devices that have additional hardware that remains powered on even when the display hardware is off cannot satisfy these more stringent environmental regulations. Therefore, the manufacturers of such display devices are forced to have the additional hardware default to being powered off when the display devices enter a low-power state. When a user purchases and turns on such a display device for the first time, or after performing a factory reset of the device, he or she then has to configure the device so that the additional hardware remains on even when the display hardware is turned off, if this is what the user desires.

However, shipping display devices with default power modes in which the additional hardware of the devices is also powered off when the display hardware is powered off can lead to poor consumer reception of the display devices. This may particularly be because such functionality is contrary to the historical behavior of such devices, to which the users may have grown accustomed. For example, when a desktop computer connected to a display device ceases providing an active video signal to the display device as part of its own power-saving strategy, one typical way in which a user can cause the computer to exit this low-power mode is to press a key on a keyboard, or click a mouse button or move a mouse. However, if the keyboard or mouse in question is connected to the display device, then this functionality will not be available, because the display device will power off the I/O port to which the keyboard or mouse is connected along with the display hardware when it detects that there is no longer an active video signal from the computing device.

Techniques disclosed herein alleviate these issues. A display device may have a power-saving mode in which a hardware component, such as an I/O port like a USB port, is powered off when display hardware of the display device is also powered off when, for instance, when an active video signal is not detected on any video input of the display device. At least a portion of the display device remains powered on in this power-saving mode, so that when an active video signal returns on a video input of the device, the display device can again power on the display hardware and the hardware component. The first time the display device is powered on after manufacture, such as by a user of the device, as well as at factory reset of the device or the first time the display device is powered on after the device has been factory reset, such as again by the user, the display device's current power mode defaults to this power-saving mode.

In response to the display device being turned on for the first time ever or for the first time after the factory reset of the device, or in response to the device being factory reset, the display device displays a message indicating that in the display device's current power mode is the power-saving mode in which the hardware component will be turned off when the display device enters a low-power state. The display device then permits the user to change the current power mode of the display device. For example, the user may change the current power mode to a different power mode in which when an active video signal is not detected on any video input of the display device, the device turns off its display hardware but does not power off the hardware component.

Such techniques at a minimum provide for a better user experience with the display device. The user is informed when turning on the display device for the first time, and is reminded after each time the device has been factory reset, that the current power mode of the display device is such that the hardware component will be powered off when the display device enters a low-power state. Inasmuch the user may not expect this behavior from a display device, the user is explicitly reminded of the behavior via the message and given an opportunity to change the behavior. The user, in other words, does not have to him or herself initiate reconfiguration of the display device's current power mode, but rather the display device prompts the user as to whether he or she wishes to do so. Therefore, the user is less likely to find him or herself in a situation in which the user cannot wake the computing device connected to the display device from a low-power sleep state, because the user's normal approach to doing so—such as by pressing a key on a keyboard, "jiggling" a mouse, or pressing a mouse button—is unavailable when the input device in question is connected to the display device.

FIG. 1 shows an example display device 100. The display device 100 includes a display 102. The display 102 can be a flat-panel display (FPD), such as a liquid-crystal display (LCD), another type of FPD, or another type of display altogether. The display 102 and its associated hardware, such as a backlight thereof, for instance, constitute the display hardware of the display device 100.

The display device 100 can include a power link 104, such as a cord or a connector, via which the device 100 indirectly or directly receives alternating current (AC) power, such as from the AC mains of a building via an AC outlet. For instance, the display device 100 may include a built-in AC-to-direct current (DC) transformer to convert AC power from the AC mains to DC power, such that the power link 104 directly connects to the AC means. As another example, the display device 100 may utilize an external AC-to-DC transformer, such that the power link 104 directly connects to the DC side of the external transformer.

The display device 100 includes at least one video link 106, such as a cord or a connector, via which the device is connected to a video source. The video source may be a computing device that lacks a built-in display, such as a desktop computer, or that has a built-in display, such as a tablet computing device, a laptop computer, a mobile computing device like a smartphone, and so on. The video source may also be a different type of device other than a computing device, such as a digital versatile disc (DVD) device, a set-top box, a digital video recorder (DVR) device, a streaming video device, and so on. The video link 106 may be an HDMI link, a video graphics array (VGA) link, a digital visual interface (DVI) link, or another type of video link. The video link 106 receives a video signal over the video link 106 from the video source, and the display 102 correspondingly displays an image in accordance with the video signal.

The display device 100 can include one or more I/O ports 108, such as USB ports, which are receptive to connection of the computing device or other device that is the video source, as well as being receptive to connection of peripheral devices, like flash memory or thumb drives, keyboards, pointing devices such as mice, and so on. The display device 100 thus serves as an intermediary, such as a USB hub in the case where the I/O ports 108 are USB ports, between the video source and the peripheral devices. Therefore, in general, connection of the peripheral devices to the I/O ports 108 of the display device 100 can cause them to be operational with respect to the video source no differently than if the peripheral devices were directly connected to similar such I/O ports of the video source itself.

The display device 100 can include speakers 110 from which audio is output, as well as a microphone 112 by which audio can be detected. The I/O ports 108, the speakers 110, and the microphone 112 are examples of additional hardware of the display device 100. Specifically, the I/O ports 108, the speakers 110, and the microphone 112 are each an example of a hardware component of the display device 100, and the hardware components together are said to constitute the additional hardware of the display device 100. The display device 100 can include other hardware components, and thus other additional hardware, as well, such as the touch portion of the display 102 when the display 102 is a touchscreen display, and so on. Still other types of hardware components that the display device 100 can have as additional hardware can include webcams, USB audio hardware, USB-PD hardware, touch controls, wireless charging hardware that wirelessly charge electronic devices such as smartphones, and so on.

The display device 100 can include a master power switch 114, which is also referred to as an AC power switch. The master power switch 114 can physically toggle between an off position and an on position, via corresponding actuation by a user, for instance. In the off position, the internal connection to the power link 104 may be turned off physically, such that the display device 100 consumes no power. In the on position, the internal connection to the power link 104 may be turned on physically, and the display device 100 consumes power in accordance with its current power state.

The display device 100 can include a secondary power switch 116, which is also referred to as a DC power switch. The secondary power switch 116 may, in comparison to the master power switch, be a momentary on switch. That is, a user may push the power switch 116, the actuation of which the display device 100 detects, and when the user releases the power switch 116, it defaults to its prior position. While the master power switch 114 has been toggled to the on position, pressing the secondary power switch 116 causes the display device 100 to switch between entry and exit of a partial power off state, as will be described later in the detailed description.

The display device 100 can include one or more one other physical controls 118 as well. The physical controls 118 permit a user to configure settings of the display device 100 at the device 100 itself. For example, the user may be permitted to switch the active video link from among the video links 106, where the display 102 displays an image according to the video signal received at the active video link. The user may be permitted to control the volume of the speakers 110, as well as change picture settings such as brightness, color, and contrast of the display 102.

Figure 2:
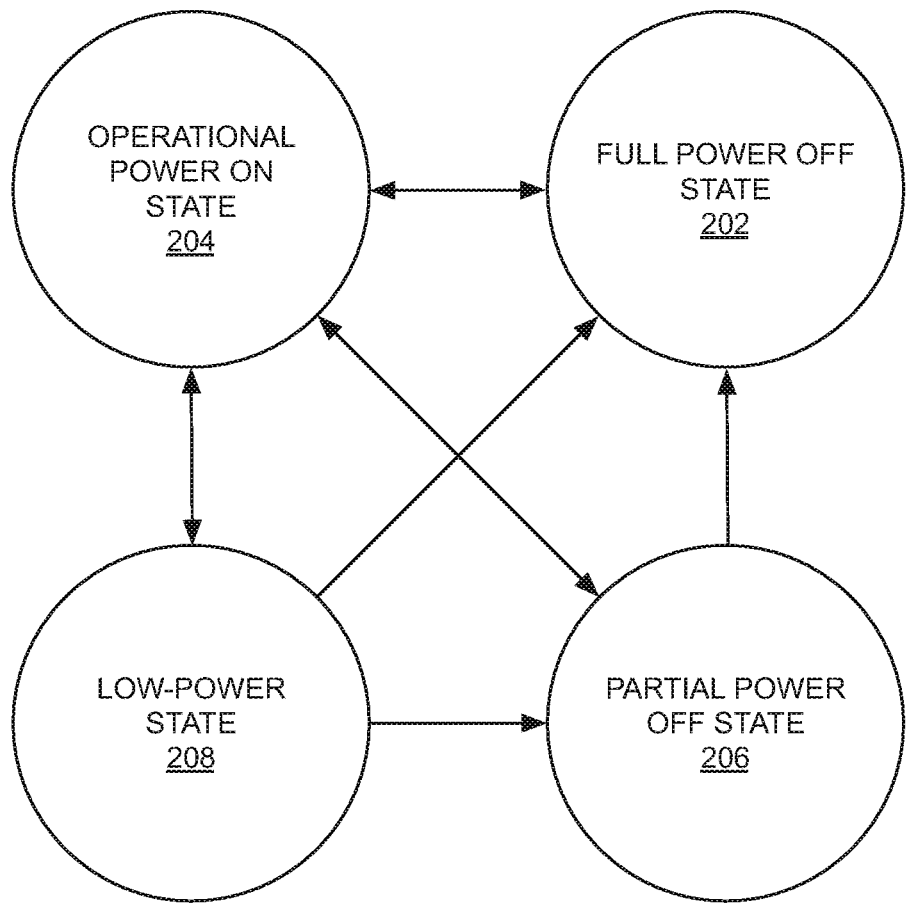
FIG. 2 is a diagram of example power states of a display device.

FIG. 2 shows four example power states 202, 204, 206, and 208 of the display device 100. In a full power off state 202, the display device 100 consumes no power. Toggling the master power switch 114 to the off position causes the display device 100 to enter the full power off state 202, regardless of whether the device 100 is currently in a state 204, 206, or 208. Toggling the master power switch 114 to the on position causes the display device to enter an operational, power on state 204.

In the operational, power on state 204, the display hardware of the display device 100, including the display 102, is powered on, and the additional hardware of the device 100, including the I/O ports 108, the speakers 110, and the microphone 112, are on. If the video source connected to the active video link 106 is actively providing a video signal, the display 102 displays an image according to this signal in the operational, power on state 204. The user can configure settings of the display device 100 via the physical controls 118 in the operational, power on state 204.

The display device 100 enters the partial power off state 206 when the secondary power switch 116 is actuated and the device is currently in the state 204 or 208. When the display device 100 is in the full power off state 202, actuation of the secondary power switch 116, by comparison, has no effect, because the component of the device 100 that detects actuation of the switch 116 is not receiving power. When the display device 100 is in the partial power off state 206, actuation of the secondary power switch 116 causes the device 100 to exit the partial power off state 206 and reenter the operational, power on state 204.

In the partial power off state 206, the display hardware of the display device 100, including the display 102, is powered off. The display device 100 may not be responsive to the physical controls 118. However, whether the additional hardware of the display device 100, such as the I/O ports 108, the speakers 110, the microphone 112, and any other such additional hardware components, are on or off depends on the current power mode of the display device 100—as opposed to the current power state of the device 100, which is different—as is described later in the detailed description.

From the operational, power on state 204, the display device 100 can also enter a low-power state 208 if an entry condition has been satisfied, and similarly the display device 100 can enter the operational, power on state 204 from the low-power state 208 if an exit condition has been satisfied. Example entry conditions can include that no active video signal is being received from the video source at the active video link 106; that no active video signal is present on any video link 106; and/or that the active video link 106 is providing an active video signal that corresponds to a static image for more than a specified length of time. Example exit conditions can include that an active video signal is now being received from the video source at the active video link 106; that an active video signal is now present on any video link 106; that the static image provided by active video link 106 has changed; and/or that one of the physical controls 118 has been detected.

In the low-power state 208, the display device 100 is operative similarly as to in the partial power off state 206. The display hardware of the display device 100, including the display 102, is powered off. Whether the additional hardware of the display device 100, such as the I/O ports 108, the speakers 110, the microphone 112, and any other such additional hardware components, are on or off depends on the current power mode of the display device 100. However, the display device 100 may still be responsive to the physical controls 118 in the low-power state 208.

Figure 3:
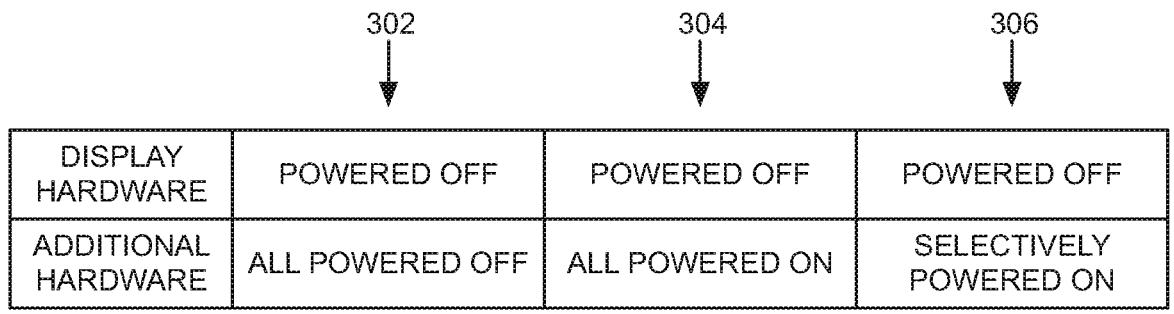
FIG. 3 is a diagram of example power modes of a display device when the display device is in a power state such as a low-power state.

FIG. 3 shows three example power modes 302, 304, and 306 of the display device 100. The display device 100 has a current power mode that is selected from the power modes 302, 304, and 306. The display device 100 is operative according to the current power mode when the device 100 is in the power state 206 or 208 of FIG. 2. In one implementation, configuring the current power mode of the display device 100 causes the device 100 to operate according to this power mode regardless of whether the device is in the power state 206 or 208. In another implementation, the display device 100 can be configured to operate in accordance with different current power modes depending on whether the device 100 is in the power state 206 or 208. Stated another way, there can be one current power mode for both power states 206 and 208, or each of the power states 206 and 208 can have its own current power mode. The following description pertains to the former implementation, in which there is one current power mode for both power states 206 and 208, but is readily extended to having a different current power mode for each power state 206 and 208. Furthermore, the following description particularly mentions the low-power state 208, but is also applicable to the partial power off state 206.

The default power mode of the display device 100 is the power mode 302. That is, at time of manufacture and at factory reset, the display device 100 is configured so that its current power mode is the power mode 302. When the display device 100 is shipped from the manufacturer and ultimately installed by an end user, the first time the device 100 is turned on the current power mode is thus the power mode 302. After the first time the device 100 is turned on, if the current power mode has been reconfigured to the power mode 304 or 306, performing a factory reset of the display device 100 causes its current power mode to again be the default power mode 302. Factory reset of the display device 100 may be performed, for instance, when the master power switch 114 is in the off position by a user depressing and holding down another physical button of the device 100 while actuating the power switch 114 to the on position.

In each of the power modes 302, 304, and 306, the display hardware of the display device 100, including the display 102, is powered off. In the power mode 302, the additional hardware of the display device 100, including the I/O ports 108, the speakers 110, the microphone 112, and any other hardware components that are considered additional hardware in this respect, are also all powered off. In the power mode 304, the additional hardware is all powered on. In the power mode 306, the additional hardware is selectively powered on. That is, a user is permitted to selectively and individually specify which hardware components should remain powered on and which should be powered or turned off. For example, zero or more of the hardware components can remain powered on in the power mode 306, whereas the other hardware components are powered off in the power mode 306.

FIGS. 4 and 5 show example methods 400 and 500, respectively. The methods 400 and 500 can be implemented as computer-executable code stored on a non-transitory computer-readable data storage medium. A display device, such as the display device 100, can then execute this code to perform each method 400 and 500. For example, processing hardware of the display device can execute the code. The processing hardware may be a general-purpose processor, an application-specific integrated circuit (ASIC), a field-programmable gate array (FPGA), and so on.

In the method 400, the display device is turned on for the first time ever or for the first time after a factory reset of the display device has been performed, or the display device has been factory reset (402). In response, the display device displays a message via its display hardware indicating that in the current, default power mode 302, a hardware component of the display device—other than the display hardware itself—is powered off when the display device enters the low-power state 208 (404). If there is more than one such hardware component of the display device, the message indicates that all the hardware components constituting the additional hardware is powered off when the display device enter the low-power state 208. That is, with respect to factory reset of the display device in one implementation part 404 is performed in response to the display device being turned on for the first time after the display device has been factory reset, and in another implementation part 404 is performed in response to the display device being factory reset.

The display device permits the user to have the hardware component remain powered on when the display device enters the low-power state 208 (406). If there is more than one hardware component, the display device can permit the user to select which hardware components are to remain powered on when the display device enters the low-power state 208, and which are to be powered off. That is, the display device permits the user to change the current power mode of the display device from the power mode 302, to the power mode 304 or 306. The display device then proceeds from the method 400 to the method 500.

In the method 500, the display device then receives input from the user indicating that the hardware component is to remain powered on when the display device enters the low-power state 208 (502). If there is just one hardware component, the user may specify that the display device should switch the current power mode from the power mode 302 to the power mode 304. If there is more than one hardware component, the user may specify that the display device should switch the current power mode from the power mode 302 to the power mode 304 or 306. If the user switches the current power mode to the power mode 306, the user can specify which hardware components are to remain powered on and which are to be powered off when the display device enters the low-power state 208.

In response, the display device accordingly changes the current power mode of the display device to the selected non-default power mode 304 and 306, in which the hardware component remains on when the display device enters the low-power state 208 (504). If there is more than one hardware component and the user has selected the power mode 304, the display device changes the current power mode to the power ode 304, in which all the hardware components remain on when the display device enters the low-power state 208. If there is more than one hardware component and the user has selected the power mode 306, the display device changes the current power mode to the power mode 306, in which some of the hardware components remain on and others remain off when the display device enters the low-power state 208.

FIG. 6 shows another example method 600 to have a hardware component of a display device remain powered on when the device enters the low-power state 208, and the default power mode of the device is for the component to be powered off when the display device enters this state. The method 600 can be implemented in the same manner as the methods 400 and 500 can, as described above. The display device is factory reset or is turned on (602), the latter such as via a switch like the master power switch 114, which causes the display device to enter the operational, power on state 204 from the full power off state 202.

At such power on of the display device, the device determines whether it has been powered on for the first time ever or for the first time following a factory reset of the device, or whether the device has just been factory reset (604). For example, a flag stored in non-volatile memory of the display device may be set to a default value at time of manufacture, and be reset to the default value as part of the factory reset process. The display device can therefore determine whether it has been powered on for the first time or for the first time after a factory reset, or has just been factory reset by inspecting this flag in memory. If the value of the flag is the default value, then the display device can conclude that it has been powered on for the first time or after a factory reset, or has just been factory reset, and then clear the flag so that it is no longer set to the default value. After the flag has been cleared the next time the display device transitions from the full power off state 202 to the operational, power on state 204, the device will determine that it is not being powered on for the first time or after the factory reset, and that it has just not been factory reset.

If the display device does determine that it has been powered on for the first time ever or for the first time after a factory reset, or that it has been factory reset (604), the device displays a graphical user interface (GUI) via its display hardware, such as on a display like the display 102. The GUI indicates that the current power mode of the display device is the default power mode of the display device—e.g., the power mode 302—in which a hardware component of the device other than the display hardware is powered off when the display device enters the low-power state 208 (606). The display device then permits the user to change the current power mode of the display device, via the GUI, so that the hardware component stays powered on when the display device enters the low-power state (608). That is, the display device permits the user to change the current power mode from the power mode 302 to the power mode 304 or, if there is more than one hardware component making up the additional hardware of the display device, to the power mode 306. The method 600 then may proceed to the method 500 of FIG. 5, in the same manner as the method 400 of FIG. 4 does.

By comparison, if the display device determines that it has not been powered on for the first time, a factory reset has not occurred between the last time the device was powered on and the most recent time the device was powered on, and that a factory reset of the device has not been performed (604), the method 600 is done (610). In this case, the user is not automatically provided an opportunity to change the current power mode of the display device, regardless of the current power mode of the display device. For instance, the current power mode of the display device can still be the default power mode 302—e.g., the user may not have changed the current power mode when the GUI was previously displayed—and if the display device has not been powered for the first time ever or for the first time after a factory reset, and the device has not just been factory reset, the user is not automatically provided an opportunity to change the current power mode of the device. Rather, the user may have to him or herself initiate changing the settings of the display device, such as via using controls like the physical controls 118, to change the current power mode to a different power mode.

Displaying the GUI or other message to indicate that the display device is in the default power mode 302 just when the display device is powered on for the first time ever or after a factory reset, or the display device has just been factory reset, is advantageous. It novelly balances, on the one hand, reminding the user that the behavior of the display device may be different from what the user normally expects with, on the other hand, potentially annoying the user by always displaying such a message when the display device is powered on. The display device may be the user's first such device that powers off the additional hardware by default when entering the low-power state 208. Therefore, an indication of this fact is beneficial. However, over time the user may become accustomed to this behavior, such that just periodic reminders may be appropriate, such as the first time the device is powered on after factory reset, or at factory reset, which typically is performed relatively infrequently.

Figure 7A:
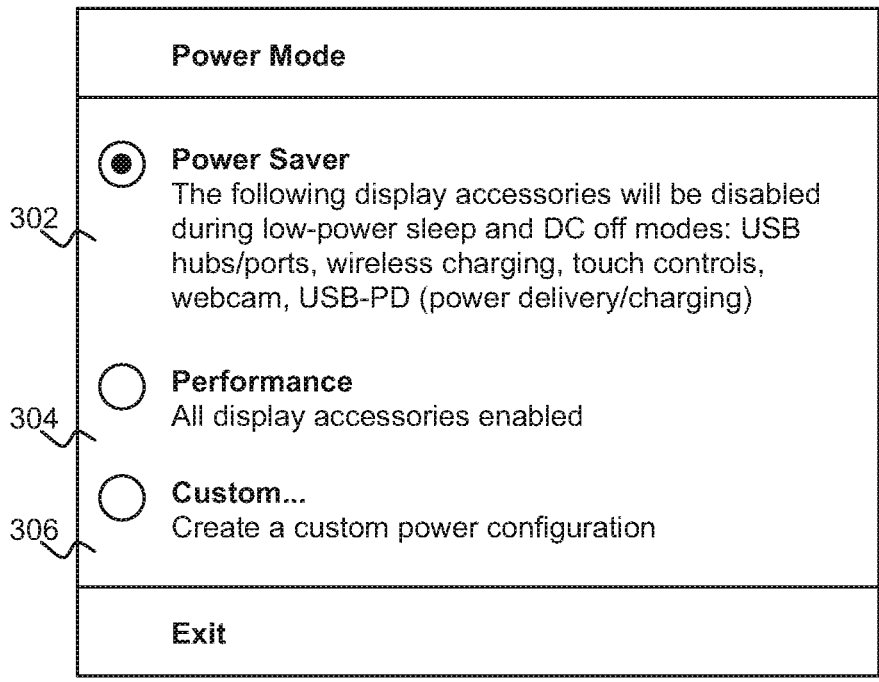
FIGS. 7A and 7B are diagrams of example graphical user interfaces (GUIs) that can be displayed when the methods of FIGS. 4, 5, and/or 6 are performed.
Figure 7B:
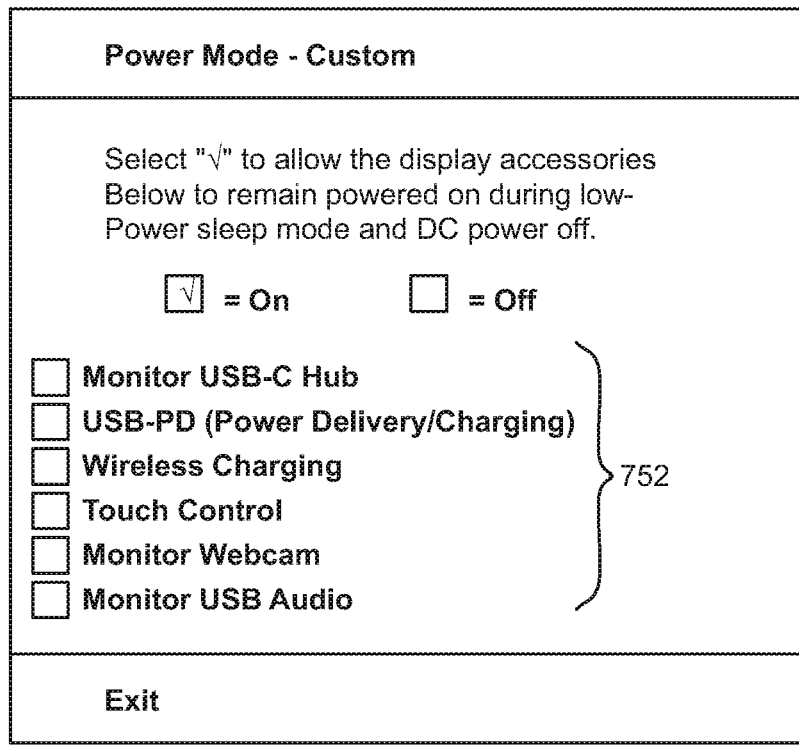

FIGS. 7A and 7B show example GUIs 700 and 750 that can be employed to implement the methods 400, 500, and 600 of FIGS. 4, 5, and 6, respectively. When a display device is turned on for the first time ever or after factory reset, or at factory reset of the device, the display device displays the GUI 700 of FIG. 7A via its display hardware, as the message or GUI to indicate that in the current, default power mode, the additional hardware of the display device is powered off when the display device enters a low-power state. The "power saver," "performance," and "custom" power modes depicted in the GUI 700 correspond to the power modes 302, 304, and 306 of FIG. 3. The GUI 700 thus displays the power modes of the display device when it enters a low-power state. The "low-power sleep" mode referred to in the GUI 700 (as well as in the GUI 750 of FIG. 7B) can be the low-power state 208 of FIG. 2, whereas the "DC power off" mode can be the partial power off state 206 of FIG. 2.

The display device permits the user to have the additional hardware completely or selectively (i.e., on a hardware component-by-hardware component basis) powered on when the device enters the low-power state by permitting the user to maintain the "power saver" power mode 302, or select the "performance" power mode 304 or the "custom" power mode 306. Within the GUI 700, each power mode 302, 304, and 306 has a corresponding radio button GUI element to permit the user to make his or her desired selection. For instance, if the display device has touchscreen capability, the user may be able to tap the desired power mode 302, 304, or 306, which checks the corresponding radio box and unchecks the previously checked radio box, and then tap "exit." If the user wishes to maintain the already selected "power saver" power mode 302, which is already selected by default and has a correspondingly checked radio box, the user can also just tap "exit" without tapping this power mode. In another implementation, there may not be any radio boxes, such that selecting a desired power mode 302, 304, or 306 highlights the power mode in question to indicate that it has been selected.

As another example, the display device may have a number of physical controls, such as the physical controls 118 of FIG. 1. The physical controls may include an up button, a down button, and a select or OK button. There may be a separate select button and a separate OK button, for instance, or a button that provides both select and OK functions, such as a button labeled with a checkmark. The terminology "select or OK button" herein encompasses each of these cases. The user can press the up and down buttons as desired to highlight the desired power mode 302, 304, or 306, and press the select or OK button to check the corresponding radio box, which unchecks the previously checked radio box. The user may then press the up and down buttons to highlight "exit," and again press the select or OK button to finalize the selection of the desired power mode 302, 304, or 306. If the user wishes to maintain the already selected "power saver" power mode 302, which is already selected by default and has a correspondingly checked radio box, the user also can just press the up and down buttons to reach "exit" and then press the select or OK button. If there are no radio boxes, the selected power mode 302, 304, and 306 may be highlighted in a different manner, such as by bolding or in a different color, than the highlighting used to indicate which part of the GUI 700 the user has currently advanced to via the up and down buttons.

If the user selects the "custom" power mode 306, then in response the display device displays the GUI 750 of FIG. 7B using its display hardware. In the GUI 750, the hardware components 752 making up the additional hardware of the display device are individually listed. The display device permits the user to individually select which of the hardware components are to remain powered on when the device enters the low-power state, and which are to be powered off.

Each hardware component 752 has a corresponding checkbox to permit the user to select or de-select the component 752 in question. For instance, if the display device has touchscreen capability, the user may be able to tap each desired hardware component 752 that is to remain powered on when the device enters the low-power state, which results in a checkmark being displayed within the corresponding checkbox of the component 752 in question. Once a hardware component 752 has been selected in this manner, the user can tap the component 752 again so that the component 752 is powered off when the display device enters the low-power state, which results in the checkmark displayed within the corresponding checkbox being removed. When the user has finished selecting the hardware components 752, if any, that are to remain powered on when the device enters the low-power state in the "custom" power mode 306, the user taps "exit."

As another example, the display device may have a number of physical controls, such as the physical controls 118 of FIG. 1, including up, down, and select or OK buttons. The user can press the up and down buttons as desired to highlight the desired hardware component 752, and press the select or OK button to add a checkmark to the corresponding checkbox. Once a hardware component 752 has been selected in this manner, when the hardware component 752 has been highlighted, the user can press the select or OK button again to remove the checkmark from the corresponding checkbox. When the user has finished selecting the hardware components 752, if any, that are to remain powered on when the device enters the low-power state in the "custom" power mode, the user presses the up and/or down buttons as desired to reach "exit" and presses the select or OK button.

Figure 8:
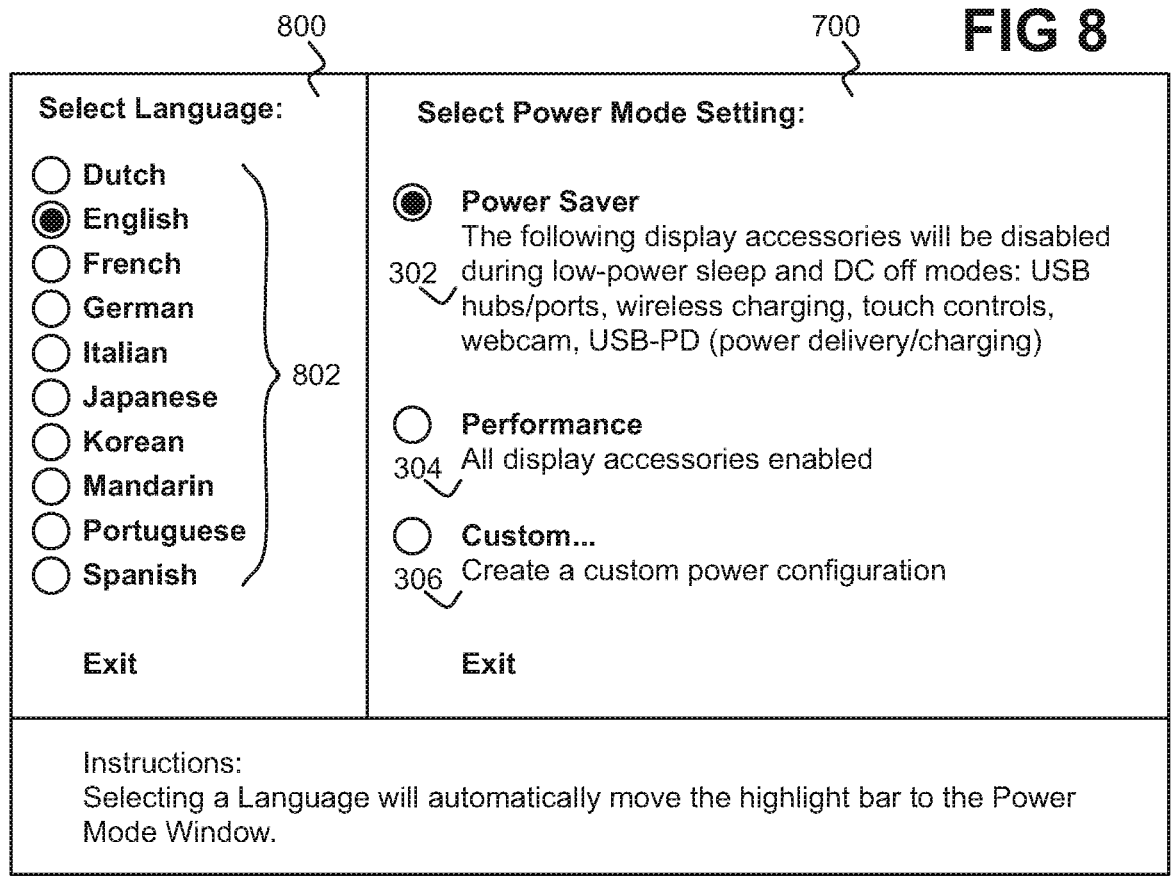
FIG. 8 is a diagram of another example GUI that can be displayed when the methods of FIGS. 4, 5, and/or 6 are performed.

FIG. 8 shows an example GUI 800 and the example GUI 700 that, along with the GUI 750 of FIG. 7B, can be employed to implement the methods 400, 500, and 600 of FIGS. 4, 5, and 6. When a display device is turned on for the first time ever or after factory reset, or at factory reset of the device, the display device displays both GUIs 800 and 700, the latter as the message or GUI to indicate that in the current, default power mode, the additional hardware of the device is powered off when the display device enters a low-power state. However, the GUI 800 may be initially active, whereas the GUI 700 may not be. The GUI 800 lists different languages 802 in which instructions presented by the display device using the display hardware are written. Although in the example of FIG. 8, each language 802 is written in English, in another implementation, each language 802 can be written in the language itself. For instance, the word "Japanese" may be written in Japanese, and so on.

The display device permits the user to change the language of the display device to one of the different languages 802 other than the default language. In the example of FIG. 8, the default language is English. Within the GUI 800, each language 802 has a corresponding radio button GUI element to permit the user to make his or her desired language selection. Selecting a language via these radio buttons can be achieved in the same manner as has been described above in relation to selecting a power mode 302, 304, or 306 within the GUI 700. The GUI 800 may lack radio buttons as well, as described above in relation to the GUI 700. Once the user has selected "exit" within the GUI 800, the display device proceeds to the GUI 700. That is, the GUI 700 becomes active, whereas the GUI 800 becomes inactive. Via the GUI 700, the user selects the power mode in accordance with which the display device is operate in a low-power state, as has been described above with respect to FIG. 7A. For example, if the user selects the "custom" power mode 306, the GUI 750 of FIG. 7B will be displayed, as has been described.

FIGS. 9A and 9B show example GUIs 900 and 950, respectively, which along with the GUIs 700 and 750 of FIGS. 7A and 7B can be employed to implement the methods 400, 500, and 600 of FIGS. 4, 5, and 6. When a display device is turned on for the first time ever or after factory reset, or at factory reset of the device, the display device displays both GUIs 900 and 950, as the message or GUI to indicate that in the current, default power mode, the additional hardware of the device is powered off when the display device enters a low-power state. The GUI 900 may be displayed in the middle of the display, such as the display 102 of FIG. 1. The GUI 950 may be displayed at the bottom of the display, aligned over physical controls, such as the physical controls 118 of FIG. 1.

The GUI 900 includes a GUI element 902. The display device permits the user to have the hardware component powered on during the low-power state by permitting the user to select the GUI element 902 to change the current power mode of the display device when the display enters the low-power state. For instance, selection of the GUI element 902 can change the current power mode of the display device from the default, power mode 302 of FIG. 3 to the power mode 304 that has been described. The user can select the GUI element 902 in a number of different ways. In one implementation, the user may be able to select the GUI element 902 directly, using touchscreen capability of the display device, or by pressing an OK or select button, which may be one of the physical controls 118 of FIG. 1. However, in another implementation, the user may not be able to select the GUI element 902 directly. Rather, the user selects the GUI element 902 indirectly, pursuant to the GUI 950.

The GUI 950 includes an icon bar 952, as well as at least three buttons 954A, 954B, and 954C, which are collectively referred to as the buttons 954. Each button 954 corresponds to a physical control, or button, which is aligned under the display of the button 954 on the display of the display device. The physical controls are considered hot keys, in that their functions may change depending on the GUI, such as the GUI 950, that is displayed on the display of the display device aligned above them. As such, the icon bar 952 serves as a legend that graphically indicates the current function of each hot key having a corresponding button 954, via an icon displayed within the bar 952 above the button 954 in question. The display device permits the user to have the hardware component powered on when the display device enters the low-power state by selecting one of the hot keys corresponding to a desired button 954.

Selection of the hot key corresponding to the button 954A causes the display device to no longer display the GUIs 900 and 950, such that the GUIs 900 and 950 are removed from display. Selection of the hot key corresponding to the button 954B causes the display device to change the current power mode to the "performance" power mode 304, in which the additional hardware of the device remains on when the display device enters the low-power state. Selection of the hot key corresponding to the button 954B is thus an indirect way by which the GUI element 902 of the GUI 900 is selected. Selection of the hot key corresponding to the button 954C causes the display device to change the current power mode to the "custom" power mode 306, and therefore to display the GUI 750 of FIG. 7B, as has been described.

As noted in the previous paragraph, selection of the hot key corresponding to the button 954A causes the display device to no longer the display the GUIs 900 and 950. Furthermore, the display device, upon displaying the GUIs 900 and 950, may start a timer. After a period of time has elapsed in which the GUIs 900 and 950 have been displayed without the user selecting the element 902 of the GUI 900 (directly or indirectly) and without the user selecting any hot key corresponding to one of the buttons 954, the display device may also remove the GUIs 900 and 950 so that they are no longer displayed. For example, this period of time may be twenty seconds or a different length of time.

Figure 10:
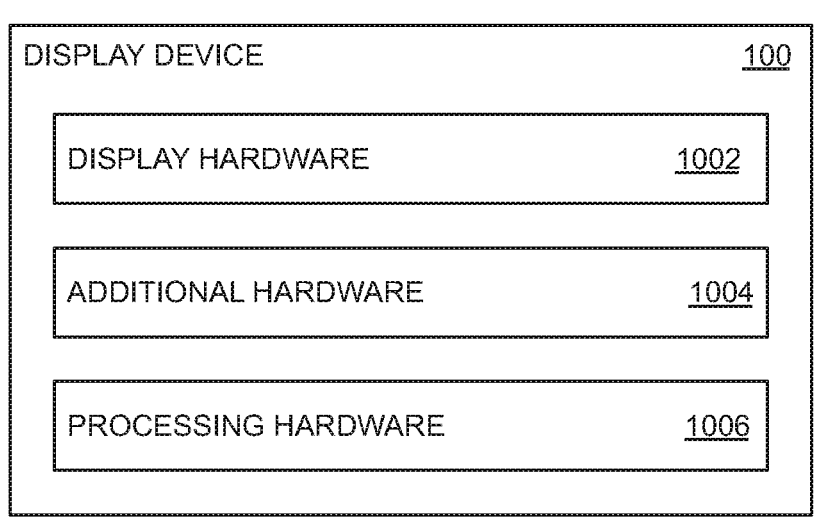
FIG. 10 is a diagram of an example display device having additional hardware that can remain on when the display device enters a state such as a low-power state.

FIG. 10 shows a block diagram of the example display device 100. The display device 100 includes at least display hardware 1002, additional hardware 1004, and processing hardware 1006. The display hardware 1002 includes the hardware that displays an image. For instance, the display hardware 1002 can include the display 102 of FIG. 1, as well as a backlight and other relevant hardware. The additional hardware 1004 is hardware other than the display hardware 1002, and which is powered off in a default power mode of the display device 100 when the device 100 enters a low-power state. The additional hardware 1004 can include one or more hardware components, such as the I/O ports 108, the speakers 110, and the microphone 112 of FIG. 1, in addition to and/or in lieu of other such hardware components, examples of which have been provided above.

The processing hardware 1006 executes computer-executable code. As noted above, the processing hardware 1006 may be a general-purpose processor, an ASIC, an FPGA, and so on. The code may be stored on a non-transitory computer-readable data storage medium that may be part of the processing hardware 1006. The medium may be separate from a general-purpose processor, or integrated within an ASIC or FPGA, for instance. The processing hardware 1006 executes the code to perform the methods 400, 500, and 600 of FIGS. 4, 5, and 6 that have been described. As such, the processing hardware 1006 executes the code to, when the display device 100 is turned on for the first time ever or after factory reset, or at factory reset of the device 100, indicate via the display hardware 1002 that in a current (default) power mode the additional hardware 1004 is powered off when the display device 100 enters the low-power state. The processing hardware 1006 executes the code to further permit a user to change the current power mode so that the additional hardware 1004 remains powered on when the display device 100 enters the low-power state.

The techniques described herein therefore permit display devices that have to have their additional hardware default to being powered off when the devices are in a low-power state to satisfy governmental regulations or otherwise meet power-saving specifications or standards to still provide a good end user experience, particularly for users who do not anticipate the devices operating in this manner. At first power on ever or at first power on after a factory reset, or at factory reset of a display device, a user is notified or reminded via a message that the additional hardware will in the current power mode be powered off when the display device enters a low-power state. The user is further given an opportunity to change this power mode so that the additional hardware will still remain on when the display device enters a low-power state, so that the display device operates as the user perhaps may have expected.

We claim:

1. A method comprising:
    in response to a display device being turned on for a first time after a factory reset thereof or the display device being factory reset,
        displaying, by the display device, a message indicating that in a default power mode that is a current power mode of the display device, a port of the display device is powered off along with display hardware when the display device enters a low-power state in response to no longer receiving a video signal from a computing device to which the display device is communicatively connected,
        wherein the port being powered off when the display device enters the low-power state disables usage of any input device coupled to the port to cause the computing device to exit a low-power mode that resulted in the computing device no longer sending the video signal to the display device; and
        permitting, by the display device, a user to have the port remain powered on when the display device enters the low-power state,
            wherein the port remaining powered on when the display device enters the low-power state enables the usage of any input device coupled to the port to cause the computing device to exit the low-power mode.

2. The method of claim 1, further comprising:
    receiving input from the user indicating that the port is to remain powered on when the display device enters the low-power state; and
    in response to receiving the input, changing the current power mode of the display device to a non-default power mode in which the port remains on when the display device enters the low-power state.

3. The method of claim 1, wherein the port is one of a plurality of hardware components of the display device, and wherein permitting the user to have the port powered on when the display device enters the low-power state comprises:
    permitting the user to select one or more of the plurality of hardware components that are to remain powered on when the display device enters the low-power state.

4. The method of claim 1, wherein the displaying the message comprises:
    displaying a graphical user interface (GUI) indicating a plurality of power modes of the display device comprising:
        a first power mode that is the default power mode;
        a second power mode in which the port remains powered on when the display device enters the low-power state,
    and wherein permitting the user to have the port remain powered on when the display device enters the low-power state comprises:
        permitting the user to maintain the first power mode or select the second power mode via the GUI.

5. The method of claim 4, wherein the port is one of a plurality of hardware components of the display device, wherein the second power mode indicates that the plurality of hardware components remain powered on when the display device enters the low-power state, wherein the power modes further comprise:
    a third power mode in which the user selects one or more of the plurality of hardware components that are to remain powered on when the display device enters the low-power state,
    wherein permitting the user to maintain the first power mode or to select the second power mode comprises permitting the user to maintain the first power mode, select the second power mode, or select the third power mode,
    and wherein permitting the user to have the port remain powered on when the display device enters the low-power state further comprises:
        in response to the user selecting the third power mode, displaying another graphical interface in which the hardware components are individually listed, and permitting the user to individually select the one or more of the plurality of hardware components that are to remain powered on when the display device enters the low-power state.

6. The method of claim 1, further comprising:
    displaying, by the display device, a graphical user interface (GUI) indicating a plurality of different languages, including a default language of the display device; and
    permitting, by the display device, the user to change a language of the display device to one of the different languages other than the default language,
    wherein displaying the message comprises:
        displaying in the GUI that indicates the plurality of different languages a plurality of power modes of the display device in the language of the display device, the power modes comprising:
            a first power mode that is the default power mode;
            a second power mode indicating that the port remains powered on when the display device enters the low-power state,
        and wherein permitting the user to have the port powered on comprises:
            permitting the user to maintain the first power mode or select the second power mode via the GUI.

7. The method of claim 1, wherein displaying the message comprises:
displaying a graphical user interface (GUI) indicating that in the current power mode of the display device the port is powered off when the display device enters the low-power state,
wherein permitting the user to have the port powered on comprises:
permitting the user to select an element of the GUI to change the current power mode of the display device,
and wherein the method further comprises:
after a period of time has elapsed in which the GUI has been displayed without the user selecting the element of the GUI, removing the GUI so that the GUI is no longer displayed.

8. The method of claim 7, wherein permitting the user to have the port powered on further comprises, in response to the user selecting the element of the GUI:
changing the current power mode of the display from a first power mode that is the default power mode, to a second power mode in which port remains on when the display device enters the low-power state.

9. The method of claim 8, wherein the port is one of a plurality of hardware components, wherein the second mode indicates that the plurality of hardware components remain powered on when the display device enters the low-power state, wherein displaying the message further comprises:
displaying a hot key button menu graphically indicating a current button mapping of a plurality of hot keys of the display device,
wherein permitting the user to have the port powered on further comprises:
in response to the user selecting a first hot key, changing the current power mode of the display from the first power mode to the second power mode;
in response to the user selecting a second hot key, displaying an additional GUI indicating a plurality of power modes of the display device comprising the first power mode, the second power mode, and a third power mode in which the user selects other of the hardware components that are to remain powered on when the display device enters the low-power state.

10. A non-transitory computer-readable data storage medium storing computer-executable code that is executable by a display device to:
at power on of the display device, determine whether the display device has been powered on for a first time after a factory reset or the display device has been factory reset;
in response to determining that the display device has been powered on after the factory reset or the display device has been factory reset, display a graphical user interface (GUI) to indicate that a current power mode of the display device is a default power mode in which a port of the display device is powered off along with display hardware when the display device enters a low-power state in response to no longer receiving a video signal from a computing device to which the display device is communicatively connected,
wherein the port being powered off when the display device enters the low-power state disables usage of any input device coupled to the port to cause the computing device to exit a low-power mode that resulted in the computing device no longer sending the video signal to the display device; and
permit a user to change the current power mode of the display device via the GUI so that the port stays powered on when the display device enters the low-power state,
wherein the port remaining powered on when the display device enters the low-power state enables the usage of any input device coupled to the port to cause the computing device to exit the low-power mode.

11. The non-transitory computer-readable data storage medium of claim 10, wherein the port is one of a plurality of hardware components, wherein the GUI lists a plurality of power modes of the display device comprising:
a first power mode that is the default power mode;
a second power mode in which the hardware components stay powered on when the display device enters the low-power state;
a third power mode in which the hardware components individually and selectively stay powered on or are powered off when the display device enters the low-power state,
and wherein the display device is to permit the user to change the current power mode via the GUI by permitting the user to maintain the first power mode, select the second power mode, or select the third power mode and individually select the hardware components that are to remain powered on when the display device enters the low-power state, via the GUI.

12. The non-transitory computer-readable data storage medium of claim 10, wherein the port is one of a plurality of hardware components, wherein the GUI comprises an element that is selectable by the user to change the current power mode of the display device,
wherein the display device is to permit the user to change the current power mode by, in response to the user selecting the element, changing the current power mode of the display from a first power mode that is the default power mode, to a second power mode in which the port remains on when the display device enters the low-power state,
and wherein the computer-executable code is executable by the display device to further:
after a period of time in which the GUI has been displayed without interaction from the user, remove the GUI so that the GUI is no longer displayed.

13. A display device for a computing device, comprising:
display hardware to display an image received from the computing device;
a port connectable to an input device of the computing device, the port powered off in a default power mode of the display device when the display device enters a low-power state; and
processing hardware to execute computer-executable code to:
in response to the display device being turned on for a first time after factory reset or the display device has been factory reset, indicate via the display hardware that in a current power mode the port is powered off along with the display hardware when the display device enters the low-power state in response to no longer receiving a video signal from a computing device to which the display device is communicatively connected,
wherein the port being powered off when the display device enters the low-power state disables usage of any input device coupled to the port to cause the computing device to exit a low-power mode that resulted in the computing device no longer sending the video signal to the display device; and permit a user to change the current power mode so that the port remains powered on when the display device enters the low-power state, wherein the port remaining powered on when the display device enters the low-power state enables the usage of any input device coupled to the port to cause the computing device to exit the low-power mode.

14. The display device of claim 13, wherein the port is one of a plurality of hardware components, wherein the processing hardware is to indicate via the display hardware that in the current power mode the port is powered off when the display device enters the low-power state by showing on the display hardware a plurality of power modes of the display device comprising:

a first power mode that is the default power mode;

a second power mode in which the hardware components stay powered on when the display device enters the low-power state;

a third power mode in which the hardware components individually and selectively stay powered on or are powered off when the display device enters the low-power state, and wherein the processing hardware is to permit the user to change the current power mode by permitting the user to maintain the first power mode, select the second power mode, or select the third power mode and individually select the hardware components that are to remain powered on when the display device enters the low-power state.

15. The display device of claim 13, wherein the processing hardware is to indicate via the display hardware that in the current power mode the port is powered off when the display device enters the low-power state by showing on the display hardware a control that is selectable by the user to change the current power mode of the display device, wherein the processing hardware is to permit the user to change the current power mode by, in response to the user selecting the control, changing the current power mode of the display from a first power mode that is the default power mode, to a second power mode in which the port remains on when the display device enters the low-power state, and wherein the processing hardware is to execute the computer-executable code to further:

after a period of time in which the control has been shown on the display hardware without selection by the user, remove the control so that the control is no longer shown.

* * * * *